US010551204B2

(12) United States Patent
Sasaki et al.

(10) Patent No.: US 10,551,204 B2
(45) Date of Patent: Feb. 4, 2020

(54) ROUTE SEARCH SYSTEM AND NON-TRANSITORY COMPUTER READABLE MEDIUM THAT STORES ROUTE SEARCH PROGRAM

(71) Applicant: TOYOTA JIDOSHA KABUSHIKI KAISHA, Toyota-shi, Aichi-ken (JP)

(72) Inventors: Kenji Sasaki, Okazaki (JP); Yuji Sato, Owariasahi (JP); Xin Jin, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 186 days.

(21) Appl. No.: 15/688,245

(22) Filed: Aug. 28, 2017

(65) Prior Publication Data
US 2018/0058867 A1    Mar. 1, 2018

(30) Foreign Application Priority Data
Sep. 1, 2016  (JP) .................................. 2016-170660

(51) Int. Cl.
*G01C 21/34* (2006.01)
*G08G 5/00* (2006.01)

(52) U.S. Cl.
CPC ..... *G01C 21/3461* (2013.01); *G01C 21/3492* (2013.01); *G08G 5/0091* (2013.01)

(58) Field of Classification Search
CPC ............ G01C 21/3461; G01C 21/3492; G08G 5/0091
USPC ....................................................... 701/415
See application file for complete search history.

(56) References Cited

U.S. PATENT DOCUMENTS

| | | | | |
|---|---|---|---|---|
| 2002/0067289 A1* | 6/2002 | Smith | ................... | G08G 1/0962 340/905 |
| 2009/0018763 A1* | 1/2009 | Koga | ..................... | H04H 60/27 701/532 |
| 2009/0043500 A1* | 2/2009 | Satoh | ................. | G01C 21/3461 701/414 |
| 2012/0150436 A1* | 6/2012 | Rossano | ............ | G01C 21/3676 701/450 |
| 2013/0103311 A1* | 4/2013 | Yanase | ............... | G01C 21/3453 701/527 |

(Continued)

FOREIGN PATENT DOCUMENTS

JP          2007-047034 A         2/2007

*Primary Examiner* — Tuan C To
(74) *Attorney, Agent, or Firm* — Hunton Andrews Kurth LLP

(57) ABSTRACT

A route search system including an electronic control unit configured to perform: acquiring estimated weather information, the estimated weather information being information about weather that is estimated in a region where a candidate of a first route from a departure place to a destination place exists; acquiring reference weather information, the reference weather information being decided based on statistical information about weather information in a predetermined behavior range of a user; and searching the first route by preferentially selecting a first road over a second road, and outputting information about the first route, the first road being a road in a first region where the estimated weather information is not worse than the reference weather information, the second road being a road in a second region where the estimated weather information is worse than the reference weather information.

11 Claims, 3 Drawing Sheets

(56) References Cited

U.S. PATENT DOCUMENTS

| | | | | |
|---|---|---|---|---|
| 2013/0131892 A1* | 5/2013 | Hashimoto | ......... | G01C 21/3469 |
| | | | | 701/1 |
| 2015/0168167 A1* | 6/2015 | Hwang | .............. | G01C 21/3691 |
| | | | | 701/522 |
| 2015/0226564 A1* | 8/2015 | Nishida | .............. | G01C 21/3453 |
| | | | | 701/526 |
| 2015/0304813 A1* | 10/2015 | Esposito | ................ | H04B 7/155 |
| | | | | 455/456.2 |
| 2015/0330807 A1* | 11/2015 | Uno | ................... | G01C 21/3691 |
| | | | | 701/41 |
| 2016/0370185 A1* | 12/2016 | Gotoh | ..................... | G06T 11/60 |
| 2018/0113882 A1* | 4/2018 | Stenneth | ................ | G06F 16/29 |

* cited by examiner

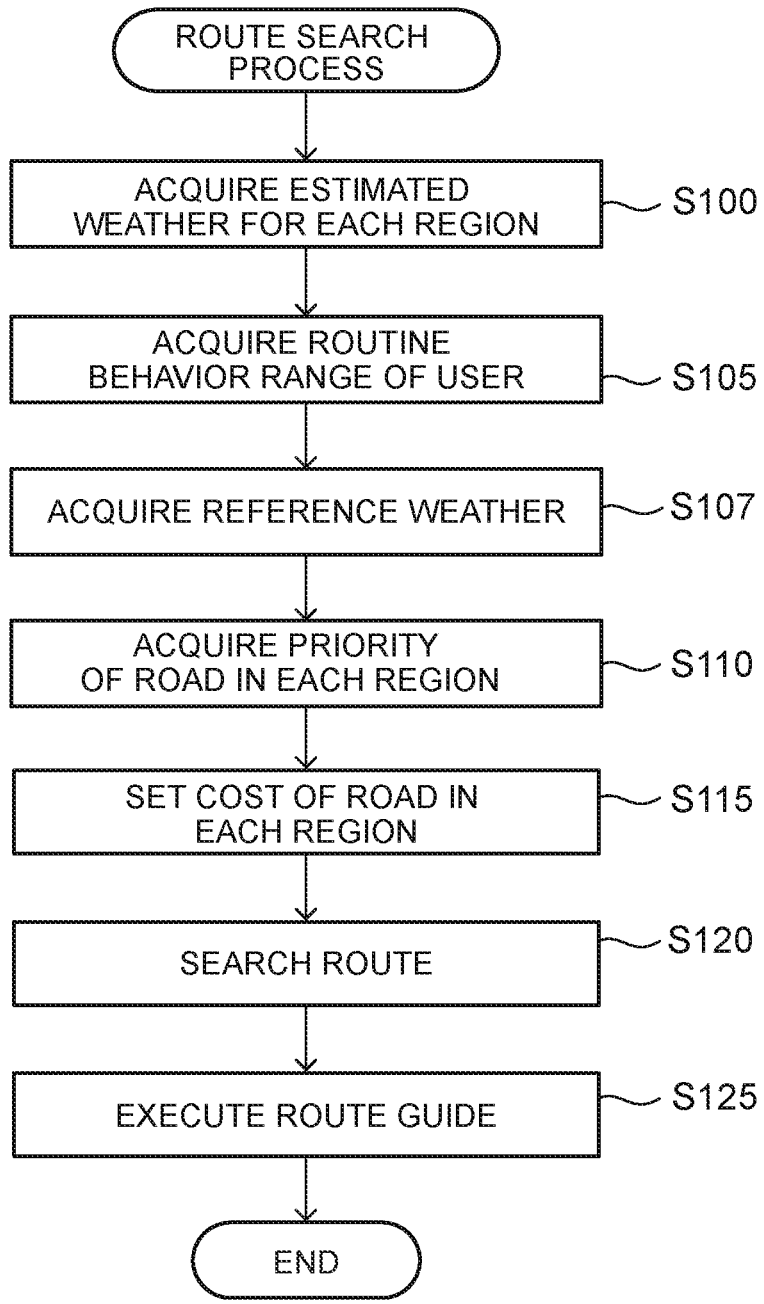

FIG. 3A

| A REGION | B REGION |
|---|---|
| • ESTIMATED WEATHER<br>　ESTIMATED<br>　PRECIPITATION<br>　AMOUNT　50ml | • ESTIMATED WEATHER<br>　ESTIMATED<br>　PRECIPITATION AMOUNT　70ml |
| C REGION | D REGION (HOME REGION) |
| • ESTIMATED WEATHER<br>　ESTIMATED<br>　PRECIPITATION<br>　AMOUNT　50ml | • ESTIMATED WEATHER<br>　ESTIMATED<br>　PRECIPITATION AMOUNT　30ml<br>• REFERENCE WEATHER<br>　MAXIMUM PRECIPITATION　　(MAXIMUM PRECIPITATION<br>　AMOUNT　100ml　　　　　　 AMOUNT　60ml)<br>　AVERAGE PRECIPITATION　　(AVERAGE PRECIPITATION<br>　AMOUNT　80ml　　　　　　　AMOUNT　40ml) |

FIG. 3B

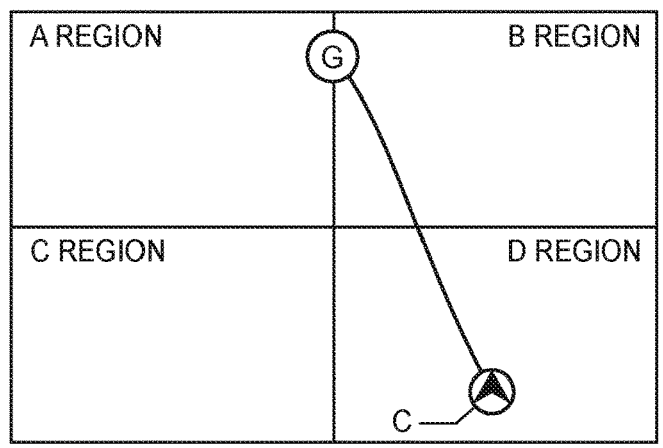

FIG. 3C

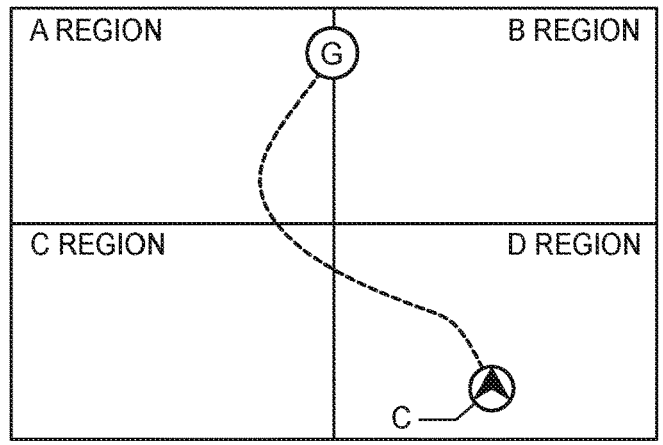

ROUTE SEARCH SYSTEM AND NON-TRANSITORY COMPUTER READABLE MEDIUM THAT STORES ROUTE SEARCH PROGRAM

INCORPORATION BY REFERENCE

The disclosure of Japanese Patent Application No. 2016-170660 filed on Sep. 1, 2016 including the specification, drawings and abstract is incorporated herein by reference in its entirety.

BACKGROUND

1. Technical Field

The disclosure relates to a route search system and a non-transitory computer readable medium that stores a route search program.

2. Description of Related Art

There is a known technology of changing a proposed route depending on weather condition. For example, Japanese Patent Application Publication No. 2007-47034 discloses a technology of detecting a spot where a rainfall or snow depth is greater than a reference value, as a safety decrease spot, and searching a detour route.

SUMMARY

In the above-described related art, the route sometimes detours around a region even though a user does not wish to detour around the region. That is, in the case where the weather is bad beyond user's experience, the detour is often appropriate because many users do not want to move under such weather. Meanwhile, even when the weather is equally bad, users who are accustomed to such weather through experience do not care about such weather, and therefore, the detour is often inappropriate. Therefore, when the weather is evaluated for all regions based on an identical reference value and the detour is performed, the user sometimes gets a feeling that the detour is unnecessary, depending on user's experience. Furthermore, in the related art, because of the detour around the spot where rainfall or the like is greater than the reference value, even when the distance of the route with the detour is extremely long, the detour route is searched, and therefore, the user is sometimes inconvenienced. Furthermore, in the related art, even when the spot where rainfall or the like exceeds the reference value is very small, the detour route is searched, and therefore, the user sometimes gets a feeling that the detour is a needless detour. The disclosure provides a technology for reducing the possibility of detouring around a region even though the user does not wish to detour around the region.

A route search system according to a first aspect of the disclosure includes an electronic control unit configured to perform: acquiring estimated weather information, the estimated weather information being information about weather that is estimated in a region where a candidate of a first route from a departure place to a destination place exists; acquiring reference weather information, the reference weather information being decided based on statistical information about weather information in a predetermined behavior range of a user; and searching the first route by preferentially selecting a first road over a second road, and outputting information about the first route, the first road being a road in a first region where the estimated weather information is not worse than the reference weather information, the second road being a road in a second region where the estimated weather information is worse than the reference weather information.

A non-transitory computer readable medium that stores a route search program according to a second aspect of the disclosure causes a computer to function as: an estimated weather acquisition unit that acquires estimated weather, the estimated weather being weather that is estimated in a region where a candidate of a route from a departure place to a destination place exists; a reference weather acquisition unit that acquires reference weather, the reference weather being decided based on a statistic about weather in a routine behavior range of a user; and a route search unit that searches the route by preferentially selecting a road in the region where the estimated weather is not worse than the reference weather over a road in the region where the estimated weather is worse than the reference weather.

A route search system according to a third aspect of the disclosure includes: an estimated weather acquisition unit that acquires estimated weather, the estimated weather being weather that is estimated in a region where a candidate of a route from a departure place to a destination place exists; a reference weather acquisition unit that acquires reference weather, the reference weather being decided based on a statistic about weather in a routine behavior range of a user; and a route search unit that searches the route by preferentially selecting a road in the region where the estimated weather is not worse than the reference weather over a road in the region where the estimated weather is worse than the reference weather.

As described above, in the route search system and the route search program, the route is searched by preferentially selecting the road in the region where the estimated weather is not worse than the reference weather over the road in the region where the estimated weather is worse than the reference weather. That is, since the reference weather is the weather that is decided based on the statistic about the weather in the routine behavior range of the user, it is presumable that the user is accustomed to encountering the reference weather. In the case where the user is accustomed to encountering a certain kind of weather, there is a low possibility that the user wishes to avoid the movement under the weather. Hence, the road in the region where the estimated weather is not worse than the reference weather is preferentially selected over the road in the region where the estimated weather is worse than the reference weather. Thereby, it is possible to reduce the possibility of detouring around a region even though the user does not wish to detour around the region.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart showing a route search process;

FIG. 3A is a diagram for describing a route search example;

FIG. 3B is a diagram for describing a route search example; and

FIG. 3C is a diagram for describing a route search example.

DETAILED DESCRIPTION OF EMBODIMENTS

Figure 1:
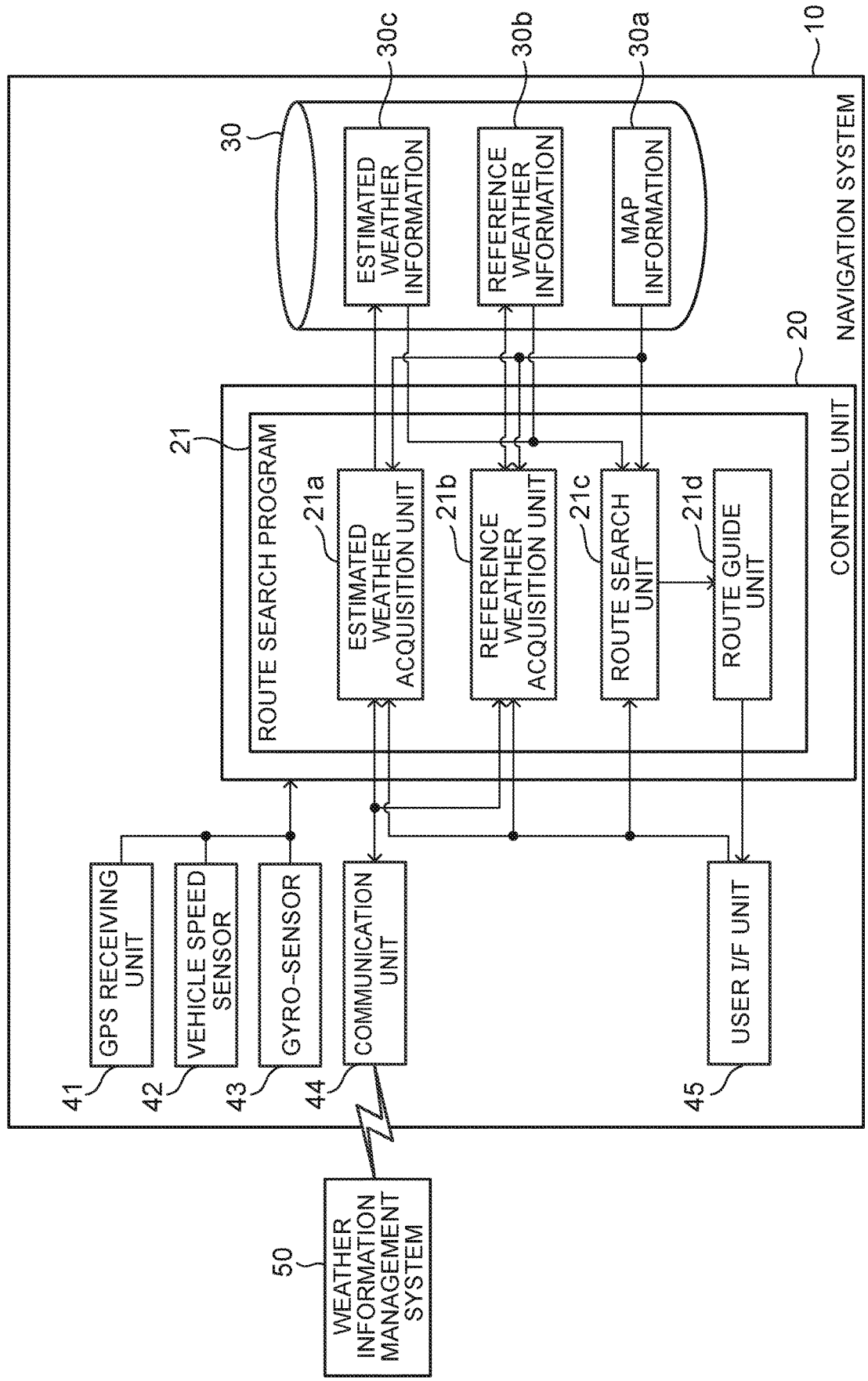
FIG. 1 is a block diagram showing the configuration of a route search system.

Herein, embodiments of the disclosure will be described in the following order: (1) Configuration of Route Search System, (2) Route Search Process and (3) Other Embodiments.

(1) Configuration of Route Search System

FIG. 1 is a block diagram showing the configuration of a navigation system 10 to function as a route search system that is an embodiment of the disclosure. The navigation system 10 includes a control unit 20 that includes a CPU, a RAM, a ROM, and the like, and the control unit 20 executes various programs that are recorded in the ROM or a recording medium 30. In the embodiment, the control unit 20 can execute a route search program 21 as one of the programs.

The control unit 20 can search a route for the arrival at a destination place from a current place as a departure place, by a process of the route search program 21. Further, the control unit 20 can execute a guide for leading a vehicle including the navigation system 10, along the route, by a process of the route search program 21.

In the recording medium 30, map information 30a is previously recorded. The map information 30a includes shape interpolation point data indicating positions of nodes corresponding to end points of road sections, and the positions of shape interpolation points for specifying shapes of roads among nodes, link data indicating links among nodes, facility data indicating positions and attributes of facilities, and the like. In the embodiment, the link data is associated with information indicating regions to which the road sections indicated in the link data belong. In the embodiment, weather information is defined for each region. Further, the link data is associated with information indicating a default value of a cost for each road section specified by the distance of the road section and the like. Further, in the operation stage of the navigation system 10, estimated weather information 30c and reference weather information 30b are recorded in the recording medium 30. Further, the position of a user's home previously registered by a user is recorded in the recording medium 30 (not illustrated).

The navigation system 10 includes a GPS receiving unit 41, a vehicle speed sensor 42, a gyro-sensor 43, a communication unit 44, and a user I/F unit 45. The user I/F unit 45 is an interface unit for inputting an instruction of the user and providing a variety of information to the user, and includes a touch-panel display and an output unit for output sound of a speaker or the like, which are not illustrated.

The GPS receiving unit 41 receives electric waves from GPS satellites, and outputs a signal for calculating the current place of the vehicle through an unillustrated interface. The vehicle speed sensor 42 outputs a signal corresponding to the rotational speed of wheels included in the vehicle. The control unit 20 acquires this signal through an unillustrated interface, and acquires the vehicle speed. The gyro-sensor 43 detects the angular acceleration in the turning of the vehicle on a horizontal plane, and outputs a signal corresponding to the orientation of the vehicle. The control unit 20 acquires this signal, to acquire the travelling direction of the vehicle. The control unit 20 acquires the current place of the vehicle, by specifying the running path of the vehicle based on output signals of the vehicle speed sensor 42, the gyro-sensor 43, and the like. The output signal of the GPS receiving unit 41 is used, for example, for the correction of the vehicle current place that is specified from the vehicle speed sensor 42, the gyro-sensor 43, and the like.

The communication unit 44 includes a circuit for wirelessly communicating with a weather information management system 50 that exists in the exterior, and through the communication unit 44, the control unit 20 can acquire weather information indicating the current weather and statistical weather in an arbitrary region, from the weather information management system 50. In the embodiment, the weather information is defined for each region. The division into the regions may be previously performed, and for example, a region division such as an administrative division can be employed. The weather information management system 50 acquires the weather information indicating the current weather, and sends the weather information as the estimated weather. Of course, a forecast of a future weather in each region may be acquired as the weather information.

By the route search program 21 in the embodiment, the control unit 20 realizes a function to search the route from the current place to the destination place based on the weather in a region where a candidate of the route exists. For executing the route search, the route search program 21 includes an estimated weather acquisition unit 21a, a reference weather acquisition unit 21b, a route search unit 21c and a route guide unit 21d.

The estimated weather acquisition unit 21a is a program module by which the control unit 20 realizes a function to acquire the estimated weather that is estimated as the weather in the region where the candidate of the route from the departure place to the destination place exists. In the embodiment, the user can input the destination place by operating the user I/F unit 45. After the destination place is input, the control unit 20 acquires the current place of the vehicle, based on the output signals of the GPS receiving unit 41, the vehicle speed sensor 42 and the gyro-sensor 43. Then, the control unit 20 regards the current place as the departure place, and acquires a region that contains the departure place and the destination place, a region that contains roads between the departure place and the destination place, and a region that is within a predetermined distance from each region, as the region where the candidate of the route exists, by referring to the map information 30a. Other than this technique, various techniques can be employed, as the technique of the acquisition of the region where the candidate of the route exists.

After the acquisition of the region where the candidate of the route exists, the control unit 20 outputs a sending request for the estimated weather in the region, to the weather information management system 50 through the communication unit 44. After the weather information management system 50 acquires the sending request, the weather information management system 50 specifies the region indicated by the sending request, and acquires the estimated weather indicating the current weather in the region. Then, the weather information management system 50 sends the estimated weather to the navigation system 10 through an unillustrated communication unit.

After the estimated weather is sent, the control unit 20 acquires the estimated weather through the communication unit 44, and records the estimated weather in the recording medium 30, as the estimated weather information 30c. As a result, the estimated weather, which is the current weather in the region where the candidate of the route exists, is specified. In the embodiment, the estimated weather may be defined by various techniques, and for example, the estimated weather may be the value of rainfall, snowfall, wind, temperature, humidity, or the like. Herein, an example in which the rainfall amount is acquired as the estimated weather (that is, an example in which the estimated weather information 30c indicates the estimated precipitation amount per unit time at the current time) will be described.

The reference weather acquisition unit 21b is a program module by which the control unit 20 realizes a function to acquire the reference weather that is decided based on a statistic about the weather in a routine behavior range of the user. In the embodiment, the control unit 20 refers to the recording medium 30, and acquires the position registered as the home. Further, the control unit 20 specifies a region that contains the position registered as the home.

Then, the control unit 20 outputs a sending request for the reference weather in the region that contains the home, to the weather information management system 50 through the communication unit 44. After the weather information management system 50 acquires the sending request, the weather information management system 50 specifies the region indicated by the sending request, and acquires the reference weather that is the statistical value of the weather in the region. Then, the weather information management system 50 sends the reference weather to the navigation system 10 through an unillustrated communication unit.

When the reference weather is sent, the control unit 20 acquires the reference weather through the communication unit 44, and records the reference weather in the recording medium 30, as the reference weather information 30b. As a result, the reference weather, which is the statistical weather in the region where the candidate of the route exists, is specified. In the embodiment, the reference weather may also be defined by various techniques, and for example, the reference weather may be the statistical value of rainfall, snowfall, wind, temperature, humidity, or the like in a previously decided period. Herein, an example in which the rainfall amount is acquired as the reference weather will be described.

A plurality of kinds of reference weather may be defined for an identical region. As the reference weather in the embodiment, the average precipitation amount per unit time and the maximum precipitation amount per unit time are first reference weather and second reference weather, respectively. The average precipitation amount only needs to be a statistical value in an arbitrary period, and for example, is the average value of monthly average precipitation amounts in a multi-year period. The maximum precipitation amount is, for example, the average value of monthly maximum precipitation amounts in a multi-year period. Of course, the average precipitation amount and the maximum precipitation amount may be values in another period. For example, the average precipitation amount and the maximum precipitation amount may be an annual average precipitation amount and an annual maximum precipitation amount.

As described above, the reference weather in the embodiment is the statistical weather in the region that contains the home of the user. Accordingly, in the embodiment, the reference weather is acquired, without checking whether the user actually has encountered each kind of weather, for example, based on a movement history of the user. Therefore, in the embodiment, it is possible to easily acquire the reference weather.

The route search unit 21c is a program module by which the control unit 20 realizes a function to search the route by preferentially selecting a road in the region where the estimated weather is not worse than the reference weather over a road in the region where the estimated weather is worse than the reference weather. That is, it is presumable that the reference weather is the weather that the user has encountered, and therefore, in the case of the weather equivalent to the reference weather or the weather better than the reference weather, there is a low possibility that the user wishes to avoid the movement on the road under the weather. On the other hand, there is a high possibility that the user has not experienced the movement under the weather worse than the reference weather, and it is thought that many users wish to avoid the movement under the weather.

Hence, the road in the region where the estimated weather in the region where the candidate of the route from the departure place to the destination place exists is not worse than the reference weather is preferentially selected over the road in the region where the estimated weather is worse than the reference weather. Thereby, it is possible to search the route while avoiding a route under the weather that the user has not encountered and preferentially selecting a route under the weather that the user has encountered.

For such a route search based on the weather, the control unit 20 refers to the map information 30a, and searches the route from the departure place to the destination place. In the embodiment, since the cost for each road section is recorded in the map information 30a, the control unit 20 searches a route that minimizes the sum of the costs. Here, in the embodiment, the control unit 20 searches the route, by correcting the default value of the cost depending on the weather in regions where roads constituting the route can exist and thereby adjusting, for each road section, the priority when the route is selected. That is, the control unit 20 decreases the priority when a road in a region is selected as the route, as the degree by which the estimated weather is worse than the reference weather becomes larger in the region.

For this purpose, the control unit 20 compares the estimated weather and the reference weather in each region, and adjusts the cost such that a road in a region is less likely to be selected as the estimated weather becomes worse than the reference weather and the gap between the two becomes larger in the region. That is, in the case where the estimated weather is worse than the reference weather and the gap between the two is large, the influence of the estimated weather on the user increases due to the lack of experience of the user, and there is a high possibility that the user strongly wishes to avoid the estimated weather. Accordingly, the priority when a road in a region is selected as the route is decreased as the degree by which the estimated weather is worse than the reference weather becomes larger in the region.

In the embodiment, since the two kinds: the average precipitation amount and maximum precipitation amount in the region that contains the home of the user are defined for the reference weather, the control unit 20 performs the comparison between the estimated weather and the average precipitation amount and the comparison between the estimated weather and the maximum precipitation amount for each region. For example, the control unit 20 compares the estimated precipitation amount and the maximum precipitation amount in a certain region. In the case where the estimated precipitation amount exceeds the maximum precipitation amount, the control unit 20 sets the correction factor of the cost to C1. Meanwhile, in the case where the estimated precipitation amount is between the average precipitation amount and the maximum precipitation amount, the control unit 20 sets the correction factor of the cost to C2. Furthermore, in the case where the estimated precipitation amount is equal to or smaller than the average precipitation amount, the control unit 20 sets the correction factor of the cost to 1 (that is, the correction is not performed).

The correction factor of the cost is a factor by which the default value of the cost is multiplied, and C1>C2>1 holds. In the embodiment, the route that minimizes the sum of the costs is searched, and therefore, when the default value of the cost is multiplied by the correction factor, the road section is less likely to be selected as the route, compared to road sections with no correction. Further, the correction factor has a magnitude relation of C1>C2, and therefore, in the case where the estimated precipitation amount exceeds the maximum precipitation amount, the priority in the selection of the route is lower than in the case where the estimated precipitation amount is between the average precipitation amount and the maximum precipitation amount.

According to the above configuration, a route under the weather that the user wishes to avoid with a high possibility is less likely to be selected. Further, the maximum precipitation amount for each region means that the weather with the precipitation amount rarely occurs in the region statistically. Accordingly, in a region where the estimated weather exceeds the maximum precipitation amount, the default value is multiplied by the correction factor C1, which has the magnitude relation of C1>C2, and thereby, a road section in the region is less likely to be selected compared to road sections in other regions. According to this configuration, a road under the weather that greatly exceeds an ordinary range is less likely to be selected compared to other roads, and a road under a bad weather that the user encounters with a very low possibility is easily avoided.

The route guide unit 21*d* is a program module by which the control unit 20 realizes a function to performs the guide about the route. That is, the control unit 20 specifies the current place of the vehicle based on the output signals of the GPS receiving unit 41, the vehicle speed sensor 42 and the gyro-sensor 43. Further, the control unit 20 refers to the map information 30*a*, and specifies a movement direction of the vehicle and an operation (right turn or left turn, for example) in front of the current place that are necessary for moving the current place along the route. Then, the control unit 20 outputs a control signal to the user I/F unit 45 to perform the guide about the movement direction and the operation, and thereby, leads the user such that the current place moves on the route. The above configuration increases the possibility that the user can arrive at the destination place through a road in a region under an accustomed weather.

(2) Route Search Process

Next, a route search process will be described in detail. FIG. 2 is a flowchart of the route search process. The route search process is executed, for example, when the user gives an instruction of the start of the route guide and inputs the destination place through the user I/F unit 45. In the route search process, the control unit 20 acquires the estimated weather for each region, by the process of the estimated weather acquisition unit 21*a* (step S100). That is, the control unit 20 acquires the current place of the vehicle based on the output signals of the GPS receiving unit 41, the vehicle speed sensor 42 and the gyro-sensor 43. Further, the control unit 20 acquires the destination place input by the user.

Furthermore, the control unit 20 refers to the map information 30*a*, and acquires the region that contains the departure place and the destination place, the region that contains roads between the departure place and the destination place, and the region that is within a predetermined distance from each region, as the region where the candidate of the route exists. Then, the control unit 20 outputs the sending request for the estimated weather in the region, to the weather information management system 50 through the communication unit 44. As a result, the weather information management system 50 sends back the estimated weather in the region, and therefore, the control unit 20 receives the estimated weather through the communication unit 44, and records the estimated weather in the recording medium 30, as the estimated weather information 30*c*.

FIG. 3A is a diagram for describing an example in which an A region, a B region, a C region and a D region are regions where candidates of the route exist. In FIG. 3A, rectangular regions schematically show the A region, the B region, the C region and the D region, respectively, and in each rectangle, the estimated precipitation amount as the estimated weather is shown. In the example shown in FIG. 3A, it is assumed that the home of the user exists in the D region, and in the rectangle showing the D region, the statistical maximum precipitation amount and average precipitation amount in the D region are shown as the reference weather. In this example, when step S100 is executed, 50 ml, 70 ml, 50 ml and 30 ml are acquired as the estimated precipitation amounts in the A region, B region, C region and D region.

Next, the control unit 20 acquires the routine behavior range of the user, by the process of the reference weather acquisition unit 21*b* (step S105). In the embodiment, the control unit 20 refers to the recording medium 30, and acquires a region that contains the position of the home, as the routine behavior range.

Next, the control unit 20 acquires the reference weather, by the process of the reference weather acquisition unit 21*b* (step S107). That is, the control unit 20 outputs the sending request for the reference weather in the region that contains the position of the home, to the weather information management system 50 through the communication unit 44. As a result, the weather information management system 50 sends back the reference weather in the region. The control unit 20 receives the reference weather through the communication unit 44, and records the reference weather in the recording medium 30 as the reference weather information 30*b*. When step S107 in FIG. 3A is executed, the maximum precipitation amount 100 ml and the average precipitation amount 80 ml in the D region are acquired as the reference weather.

Next, the control unit 20 acquires the priority of the road in each region, by the process of the route search unit 21*c* (step S110). That is, the control unit 20 compares the estimated weather and the reference weather for each region where the candidate of the route exists, and acquires the priority when the road is selected. Specifically, the control unit 20 compares the estimated precipitation amount and the maximum precipitation amount for each region where the candidate of the route exists. In the case where the estimated precipitation amount exceeds the maximum precipitation amount, the control unit 20 sets the correction factor of the cost to C1. In the case where the estimated precipitation amount for each region is between the average precipitation amount and the average precipitation amount, the control unit 20 sets the correction factor of the cost to C2. In the case where the estimated precipitation amount for each region is equal to or smaller than the average precipitation amount, the control unit 20 sets the correction factor of the cost to 1.

In the example shown in FIG. 3A, the estimated precipitation amount 50 ml in the A region and C region is smaller than the average precipitation amount 80 ml in the D region.

Accordingly, the correction factor of the cost for the A region is 1. The estimated precipitation amount 70 ml in the B region is smaller than the average precipitation amount 80 ml in the D region. Accordingly, the correction factor of the cost for the B region is 1. The estimated precipitation amount 30 ml in the D region is smaller than the average precipitation amount 80 ml. Accordingly, the correction factor of the cost for the D region is 1.

Thus, the estimated precipitation amount in the A region is larger than the estimated precipitation amount in the B region, but the estimated precipitation amounts in both regions are smaller than the average precipitation amount in the D region, which is the behavior range of the user. Accordingly, in this example, in both the A region and the B region, the estimated precipitation amounts are not worse than the average precipitation amount that is the first reference weather. In this case, the control unit 20 regards both the A region and the B region as regions with estimated precipitation amounts in which the user is accustomed to moving, and equivalently sets the correction factor of the cost for the road section in the A region and the correction factor of the cost for the road section in the B region. Here, the correction factor is multiplied by the cost, and as the value becomes larger, the cost increases and the road is less likely to be selected. Therefore, when each of the correction factors C1, C2 and 1 is decided, the priority in the road selection for each region can be regarded as being set to "Low", "Middle" or "High".

Next, the control unit 20 sets the cost of the road in each region, by the process of the route search unit 21c (step S115). That is, the control unit 20 multiplies the default value of the cost of the road section in each region by the correction factor of the cost acquired in step S110, for each region where the candidate of the route exists. The cost after the correction is referred to, at the time of the route search.

After the cost is set, the control unit 20 searches the route, by the process of the route search unit 21c (step S120). That is, the control unit 20 searches the route such that the sum of the costs of the road sections constituting the route from the departure place to the destination place is minimized, for example, using an algorithm such as the Dijkstra's algorithm.

FIG. 3B is a diagram schematically showing a route that is acquired in the example shown in FIG. 3A. In FIG. 3B, a current place C of the vehicle exists in the D region, and a destination place G exists on the border between the A region and the B region. In this example, when the route search is performed based on the cost after the correction, the B region, in which the estimated precipitation amount is relatively large, is not regarded as a region around which the user should detour, because the weather makes no difference in cost among the A region, the B region and the C region. As a result, for example, a route shown by a solid line in FIG. 3B, whose total distance is short, is searched.

On the other hand, in the case where the route is searched such that a region with a large precipitation amount is avoided as in the case of the related art, a route avoiding the B region with a large precipitation amount can be searched even if the user is accustomed to the precipitation amount. As a result, a route shown by a broken line in FIG. 3C, which detours around the B region, can be searched. However, in the example, the user is accustomed to the estimated precipitation in the B region, and therefore, if a route that detours around the B region is searched, the user possibly gets a feeling that the route unnecessarily detours. Therefore, according to the configuration in which the B region with a relatively large precipitation amount is on the route as shown in FIG. 3B, it is possible to reduce the possibility of detouring around a region even through the user does not wish to detour around the region.

Here, in the example shown in FIG. 3A, if the conditions of the reference weather in the D region are the maximum precipitation amount 60 ml and the average precipitation amount 40 ml as shown in parentheses, the correction factors for the A region and the C region are set to C2, and the correction factor for the B region is set to C1, in step S110. That is, the estimated precipitation amount in the A region is between the average precipitation amount as the first reference weather and the maximum precipitation amount as the second reference weather, and therefore, the estimated precipitation amount in the A region is not worse than the second reference weather. Meanwhile, the estimated precipitation amount in the B region is larger than the maximum precipitation amount as the second reference weather, and therefore, the estimated precipitation amount in the B region is worse than the second reference weather. Accordingly, in this case, the correction factor for the A region is C2, and the correction factor for the B region is C1. Thereby, the road in the A region is preferentially selected over the road in the B region. When the costs are set with such correction factors in step S115 and the route is searched, the possibility of searching the route shown by the broken line in FIG. 3C is higher than the possibility of searching the route shown by the solid line in FIG. 3B. As a result, the route avoiding the B region under the weather that the user rarely experiences is searched.

After the route is searched, the control unit 20 executes the route guide, by the process of the route guide unit 21d (step S125). That is, the control unit 20 specifies the movement direction and vehicle operation that are necessary for moving the current place along the route, and outputs the control signal to the user I/F unit 45 to perform the guide about the movement direction and the operation.

(3) Other Embodiments

The above embodiment is one example for carrying out the disclosure, and various other embodiments can be employed as long as the estimated weather and the reference weather are compared and the priority in the selection of the road in each region is changed depending on the comparison result. For example, the navigation system 10 may be a portable device. The navigation system 10 may be used for the guide of an object other than the vehicle, for example, for the guide of a walker. Furthermore, means for configuring the route search system may be divided to exist in a plurality of devices (for example, a client and a server). Furthermore, the route search system may be included in a device other than the navigation system 10. For example, the route search system may be included in a server that accepts the sending request for the route from the navigation system 10.

Furthermore, at least some of the estimated weather acquisition unit 21a, the reference weather acquisition unit 21b, the route search unit 21c and the route guide unit 21d that constitute the route search system may be divided to exist in a plurality of devices. Of course, some of the constituents of the above-described embodiment may be excluded, and the order of the processes may be changed or some of the processes may be excluded. For example, the acquisition order of the estimated weather and the reference weather may be changed. Furthermore, although the priority of the road to be selected as the route is acquired based on the cost, the preferential selection of the road may be performed by a technique other than the cost-based technique. For example, it is allowable to adopt a configuration in which a road in a region where the estimated weather is worse than the reference weather is not selected. Furthermore, regions where the current place and the destination place exist, and regions near the two places (regions within predetermined distances) cannot be excluded from the route, and therefore, the adjustment of the cost may be skipped.

The estimated weather acquisition unit only needs to be capable of acquiring the estimated weather that is estimated as the weather in the region where the candidate of the route from the departure place to the destination place exists. That is, the estimated weather acquisition unit acquires, as the estimated weather, the weather that influences the movement in the region where the route to be searched can exist. The estimated weather only needs to allow the evaluation of the degree of the influence of the weather at the time of passing through the road contained in the route to be searched. For example, it is allowable to employ a configuration of acquiring, as the estimated weather, the weather at the current time or the weather at the time point when the user arrives at the road.

The estimated weather may be specified by various techniques, and examples thereof include a configuration of acquiring the information indicating the weather in the region where the candidate of the route exists, from a management system for weather information or the like. The region where the candidate of the route exists may be specified by various techniques, and examples thereof include a region that contains the departure place, a region that contains the destination place, regions that exist between the departure place and the destination place, and regions in the periphery of each region (for example, regions that exist within a previously decided distance). The division into the regions may be decided by various techniques, and for example, may be an administrative division or may be a division (a mesh or the like) that is used in map information indicating road networks.

The departure place only needs to be a start point of the route, and the destination place only needs to be an end point of the route (a stop point in the case where there are a plurality of destination places). The route is a road along which the user should move for the arrival at the destination place from the departure place. As the aspect of the estimated weather, various aspects may be employed. For example, the estimated weather may be specified by the condition of the weather, or may be specified by the strength of the weather. As the former, there are conditions such as rainfall, snowfall, strong wind and high temperature, and as the latter, a maximum, an average, a median, or the like that is estimated as an amount, strength, magnitude, or the like in a previously decided period such as an hour can be employed.

The reference weather acquisition unit only needs to be capable of acquiring the reference weather that is decided based on the statistic about the weather in the routine behavior range of the user. That is, the reference weather acquisition unit only needs to be capable of acquiring, as the reference weather, the weather that the user has encountered, based on the statistic in the routine behavior range of the user.

As the aspect of the reference weather, various aspects can be employed. For example, the reference weather may be specified by the condition of the weather, or may be specified by the strength of the weather. As the former, there are conditions such as rainfall, snowfall, strong wind and high temperature, and as the latter, a maximum, an average, a median, or the like that is a statistical value of an amount, strength, magnitude, or the like in a previously decided period such as an hour can be employed. The period for the statistic may be an arbitrary period, and for example, there is a value resulting from collecting monthly averages or the like of amounts (precipitation amounts or the like) per unit time for a multi-year period. The reference weather may be specified by various techniques, and examples thereof include a configuration of acquiring the information indicating the statistical weather in the routine behavior range of the user, from the management system for weather information, and a configuration of previously defining the information indicating the statistical weather in the routine behavior range of the user and recording the information in the recording medium of the navigation system 10.

The routine behavior range of the user only needs to be a behavior range for specifying the weather that the user has encountered. For example, the routine behavior range of the user may be a region that contains the home of the user, or may be a region that contains a road for which the use frequency is relatively high in the movement history of the user (for example, a region that contains a movement range in which exceptional movements are removed), and various configurations can be employed. Since the reference weather is the statistical weather in the behavior range, it is not always necessary to specify whether the user has actually encountered the weather, if the behavior range is specified. That is, the statistic about the weather in the behavior range may be acquired regardless of the movement history of the user.

The route search unit only needs to be capable of searching the route by preferentially selecting the road in the region where the estimated weather is not worse than the reference weather over the road in the region where the estimated weather is worse than the reference weather. That is, the route search unit only needs to be capable of searching the route from the departure place to the destination place, and on this occasion, adjusting whether each road constituting a route is likely to be selected as the route depending on the weather in a region where the road can exist.

Accordingly, the region to which each road belongs is previously defined, and when the weather in each region is specified, the weather at each road belonging to the region is specified. Therefore, when the estimated weather and the reference weather are compared for each region, it is possible to specify whether each road should be preferentially selected as the route. Here, the route may be specified by various other elements, and for example, a road allowing the shortening of route distance, travel time, or the like may be preferentially selected.

As the technique for specifying the route by a plurality of elements in this way, for example, there is a technique of specifying the cost for each road section and searching a route that minimizes costs. Of course, various adjustments may be performed to the cost (the adjustment may be performed in accordance with a decided rule, for example, by giving priority to distance or by giving priority to toll roads). In the case where the route is searched based on a plurality of elements and where the elements other than weather are fixed, the road in the region where the estimated weather is not worse than the reference weather may be preferentially selected over the road in the region where the estimated weather is worse than the reference weather.

Whether the weather is good or bad may be determined by a previously decided determination criterion, and for example, the determination can be performed depending on the magnitude of a numerical value indicating the weather. As an exemplary determination criterion, the numerical value of rainfall amount, snowfall amount, wind speed, or the like is compared between the estimated weather and the reference weather, and in the case where the numerical value of the estimated weather is larger than the numerical value of the reference weather, it is determined that the estimated weather is worse than the reference weather. Of course, in the case where the weather is defined by the condition of the weather, a determination criterion about the comparison result of the condition of the weather may be previously decided, and whether the weather is good or bad may be determined based on the criterion.

Furthermore, as the technique for adjusting the priority when the route is selected depending on the weather, it is allowable to employ a configuration in which the route search unit decreases the priority when a road in a region is selected as the route as the degree by which the estimated weather is worse than the reference weather becomes larger in the region. That is, it is allowable to employ a configuration in which a road in a region is less likely to be selected as the estimated weather becomes worse than the reference weather and the gap between the two becomes larger in the region. In the case where the estimated weather is worse than the reference weather and the gap between the two is large, the influence of the estimated weather on the user increases due to the lack of experience of the user, and there is a high possibility that the user strongly wishes to avoid the estimated weather. Therefore, according to the configuration of decreasing the priority when a road in a region is selected as the route as the degree by which the estimated weather is worse than the reference weather becomes larger in the region, the weather that the user highly possibly wishes to avoid is less likely to be selected. Here, the priority may be decided depending on a previously decided rule, and may be changed in a continuous manner or may be changed in a stepwise manner.

In the case where the priority is changed in steps, a plurality of kinds of reference weather may be defined and the estimated weather may be compared to each kind of reference weather. As such a configuration example, it is allowable to employ a configuration in which the estimated weather is the estimated precipitation amount per unit time in the region and the reference weather includes the average precipitation amount per unit time as first reference weather and the maximum precipitation amount per unit time as second reference weather. According to this configuration, it is possible to compare the estimated weather and the two kinds of reference weather.

Furthermore, in this configuration, in the case where the estimated precipitation amount exceeds the maximum precipitation amount, the route search unit decreases the priority compared to in the case where the estimated precipitation amount is between the average precipitation amount and the maximum precipitation amount. That is, the maximum precipitation amount as the second reference weather means that the weather rarely becomes the weather with such a precipitation amount statistically. Accordingly, it is preferable that a region where the estimated weather exceeds the maximum precipitation amount as the second reference weather be less likely to be selected compared to a region where the estimated weather is the weather with a smaller precipitation amount. According to this configuration, a road under the weather that greatly exceeds an ordinary range of the weather that the user can routinely encounter is less likely to be selected compared to other roads, and a route avoiding a road that highly possibly obstructs road passing is likely to be selected.

Furthermore, it is allowable to employ a configuration of including the route guide unit that performs the guide about the route. That is, by the guide about the searched route, the guided user can move along the route. Of course, as the aspect of the guide about the route, various aspects may be employed. For example, the road sections on the route may be displayed on a map, so as to be distinguished from the other road sections, or a guide for leading the user such that the current place moves on the route may be output.

Furthermore, in the configuration of performing the guide about the route, when there is a difference between the route searched by the route search unit and the route searched without the preferential selection of the road based on the estimated weather and the reference weather, the route guide unit may guide a different part. That is, in the case of performing the route search with the preferential selection of the road based on the estimated weather and the reference weather and the route search (the route search in the related art) without the preferential selection of the road based on the estimated weather and the reference weather, a different part can be produced.

In this case, by the guide about the different part, in the case of employing the route search with the preferential selection of the road based on the estimated weather and the reference weather, the user can recognize a part that would be not on the route in ordinary circumstances (a part that is selected due to a detour). In the example shown in FIG. 3B and FIG. 3C, an example is assumed that the control unit 20 searches the route shown by the broken line in FIG. 3C by performing the route search using the cost after the correction and searches the route shown by the solid line in FIG. 3B by performing the route search using the default value of the cost. In this example, the control unit 20 acquires the difference between the route shown by the broken line in FIG. 3C and the route shown by the solid line in FIG. 3B. Then, the control unit 20 outputs a control signal to the user I/F unit 45, and highlights a different part between the two, on the route shown by the solid line in FIG. 3C. Thereby, the user can recognize the part on the route that is selected due to the detour.

Furthermore, in the disclosure, the technique of comparing the estimated weather and the reference weather and changing the priority in the selection of the road in each region depending on the comparison result can be applied as a program or a method. Further, the above system, method or program can be realized by a single device or can be realized by a plurality of devices, and includes various aspects. For example, a navigation system, method or program including the above-described means can be provided. Further, when appropriate, modifications can be made. For example, a part may be implemented in software, and a part may be implemented in hardware. Furthermore, the disclosure is satisfied also as a recording medium for the program that controls the system. Of course, the software recording medium may be a magnetic recording medium, or may be a magneto-optical recording medium. The same goes for any recording medium that will be developed in the future.

What is claimed is:

1. A route search system comprising an electronic control unit configured to perform:
    acquiring estimated weather information, the estimated weather information being weather information that is estimated in a region where a candidate of a first route from a departure place to a destination place exists;
    acquiring reference weather information, the reference weather information being decided based on statistical information about weather information in a predetermined behavior range of a user; and searching the first route by preferentially selecting a first road over a second road, and outputting information about the first route, the first road being a road in a first region where the estimated weather information is not worse than the reference weather information, the second road being a road in a second region where the estimated weather information is worse than the reference weather information.

2. The route search system according to claim 1, wherein the predetermined behavior range is at least one of a region containing a home of the user and a region containing a road for which a use frequency is relatively high in a movement history of the user.

3. The route search system according to claim 1, wherein a third road is preferentially selected over a fourth road, the third road being a road in a third region having a first degree, the first degree being a degree by which the estimated weather information is worse than the reference weather information, the fourth road being a road in a fourth region where the degree by which the estimated weather information is worse than the reference weather information is larger than the first degree.

4. The route search system according to claim 3, wherein the estimated weather information is an estimated precipitation amount per unit time in the region, the reference weather information includes an average precipitation amount per unit time in the region as first reference weather information and a maximum precipitation amount per unit time in the region as second reference weather information, and a fifth road is preferentially selected over a sixth road, the fifth road being a road in a fifth region where the estimated precipitation amount is between the average precipitation amount and the maximum precipitation amount, the sixth road being a road in a sixth region where the estimated precipitation amount exceeds the maximum precipitation amount.

5. The route search system according to claim 1, further comprising a user interface that performs guide of the user based on information output by the electronic control unit, wherein the electronic control unit searches a second route from the departure place to the destination place, the second route search being searched without the preferential selection associated with comparison between the estimated weather information and the reference weather information;

extracts a difference between the first route and the second route; and instructs the user interface to perform guide about the difference.

6. A non-transitory computer readable medium that stores therein a route search program, the route search program configured to cause a computer to function to:

acquire estimated weather information, the estimated weather information being weather information that is estimated in a region where a candidate of a first route from a departure place to a destination place exists;

acquire reference weather information, the reference weather information being decided based on statistical information about weather information in a predetermined behavior range of a user; and search the first route by preferentially selecting a road in the region where the estimated weather information is not worse than the reference weather information over a road in the region where the estimated weather information is worse than the reference weather information.

7. A route search system comprising:

an electronic control unit including an estimated weather acquisition unit, a reference weather acquisition unit, and a route search unit, wherein the estimated weather acquisition unit configured to acquire estimated weather, the estimated weather being weather that is estimated in a region where a candidate of a route from a departure place to a destination place exists;

the reference weather acquisition unit configured to acquire reference weather, the reference weather being decided based on a statistic about weather in a routine behavior range of a user; and the route search unit configured to search the route by preferentially selecting a road in the region where the estimated weather is not worse than the reference weather over a road in the region where the estimated weather is worse than the reference weather.

8. The route search system according to claim 7, wherein the routine behavior range is at least one of a region containing a home of the user and a region containing a road for which a use frequency is relatively high in a movement history of the user.

9. The route search system according to claim 7, wherein the route search unit decreases a priority when a road in the region is selected as the route, as a degree by which the estimated weather is worse than the reference weather becomes larger in the region.

10. The route search system according to claim 9, wherein the estimated weather is an estimated precipitation amount per unit time in the region, the reference weather includes an average precipitation amount per unit time in the region as first reference weather and a maximum precipitation amount per unit time in the region as second reference weather, and when the estimated precipitation amount exceeds the maximum precipitation amount, the route search unit decreases the priority compared to when the estimated precipitation amount is between the average precipitation amount and the maximum precipitation amount.

11. The route search system according to claim 7, further comprising a route guide unit that performs guide about the route, wherein when there is a difference between the route searched by the route search unit and the route searched without the preferential selection of the road based on the estimated weather and the reference weather, the route guide unit performs guide about a different part.

* * * * *